United States Patent
Mori

(10) Patent No.: US 12,140,500 B2
(45) Date of Patent: Nov. 12, 2024

(54) CONTROL METHOD, CONTROL DEVICE, CONTROL SYSTEM, AND TIRE TESTING METHOD

(71) Applicant: BRIDGESTONE CORPORATION, Tokyo (JP)

(72) Inventor: Ryosuke Mori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 189 days.

(21) Appl. No.: 17/596,778

(22) PCT Filed: Jul. 21, 2020

(86) PCT No.: PCT/JP2020/028335
§ 371 (c)(1),
(2) Date: Dec. 17, 2021

(87) PCT Pub. No.: WO2021/015211
PCT Pub. Date: Jan. 28, 2021

(65) Prior Publication Data
US 2022/0316988 A1 Oct. 6, 2022

(30) Foreign Application Priority Data

Jul. 22, 2019 (JP) .................................. 2019-134885

(51) Int. Cl.
*G01M 17/02* (2006.01)
*B60C 19/00* (2006.01)

(52) U.S. Cl.
CPC ............. *G01M 17/02* (2013.01); *B60C 19/00* (2013.01); *B60C 2019/004* (2013.01)

(58) Field of Classification Search
CPC ..... G01M 17/02; G01M 17/007; B60C 19/00; B60C 2019/004; B60W 30/09;
(Continued)

(56) References Cited

U.S. PATENT DOCUMENTS 9,336,684 B2 * 5/2016 Harasaki .............. G05D 1/0289
9,864,063 B2   1/2018 Gruver et al.
(Continued)

FOREIGN PATENT DOCUMENTS

CN    101540108 A    9/2009
CN    106949927 A    7/2017
(Continued)

OTHER PUBLICATIONS

Communication dated Oct. 20, 2023 issued by the State Intellectual Property Office of the P.R.China in application No. 202080052423.1.
(Continued)

*Primary Examiner* — Rodney A Butler
(74) *Attorney, Agent, or Firm* — Sughrue Mion, PLLC

(57) ABSTRACT

A control method of a vehicle (1) according to the present disclosure is a control method for controlling a vehicle (1) that has tires (6) mounted thereon and drives autonomously on a course (200) that includes a banked section (230). The control method includes an acquisition step of acquiring a detection result of a sensor (12) that detects information about the vehicle (1) or the course (200), and a control step of stopping the vehicle (1) so that the vehicle (1) does not enter the banked section (230) when it is determined that there is another vehicle in the banked section (230) based on the detection result of the sensor (12).

57 Claims, 4 Drawing Sheets

(58) Field of Classification Search
CPC ........... B60W 30/143; B60W 60/0015; B60W 2554/4041; B60W 2720/10; B62D 15/025
See application file for complete search history.

(56) References Cited

U.S. PATENT DOCUMENTS

| | | | |
|---|---|---|---|
| 10,953,878 | B2 | 3/2021 | Zinner et al. |
| 2016/0231746 | A1 | 8/2016 | Hazelton et al. |
| 2017/0162056 | A1 | 6/2017 | Feyerabend et al. |
| 2017/0313332 | A1* | 11/2017 | Paget .................... B61L 25/025 |
| 2018/0237027 | A1 | 8/2018 | Lundsgaard |
| 2021/0272398 | A1 | 9/2021 | Mori et al. |

FOREIGN PATENT DOCUMENTS

| | | |
|---|---|---|
| CN | 107430195 A | 12/2017 |
| CN | 108615373 A | 10/2018 |
| CN | 109187042 A | 1/2019 |
| CN | 109416542 A | 3/2019 |
| CN | 208672321 U | 3/2019 |
| CN | 109668742 A | 4/2019 |
| JP | 4-310109 A | 11/1992 |
| JP | 8-036691 A | 2/1996 |
| JP | 2000-353299 A | 12/2000 |
| JP | 2001-154733 A | 6/2001 |
| JP | 2007-164432 A | 6/2007 |
| JP | 2013-092452 A | 5/2013 |
| JP | 2013-134213 A | 7/2013 |
| JP | 2019-82831 A | 5/2019 |
| JP | 2020-006718 A | 1/2020 |
| JP | 2020-6719 A | 1/2020 |
| JP | 2020-012711 A | 1/2020 |

OTHER PUBLICATIONS

Extended European Search Report dated Aug. 14, 2023 in European Application No. 20844577.5.
International Preliminary Report on Patentability dated Jan. 25, 2022 issued by the World Intellectual Property Organization with a Translation of the Written Opinion of the International Searching Authority in Application No. PCT/2020/028335.
International Search Report for PCT/JP2020/028335 dated, Aug. 25, 2020 (PCT/ISA/210).
Extended European Search Report dated Sep. 24, 2024 in Application No. 24178641.7.

* cited by examiner

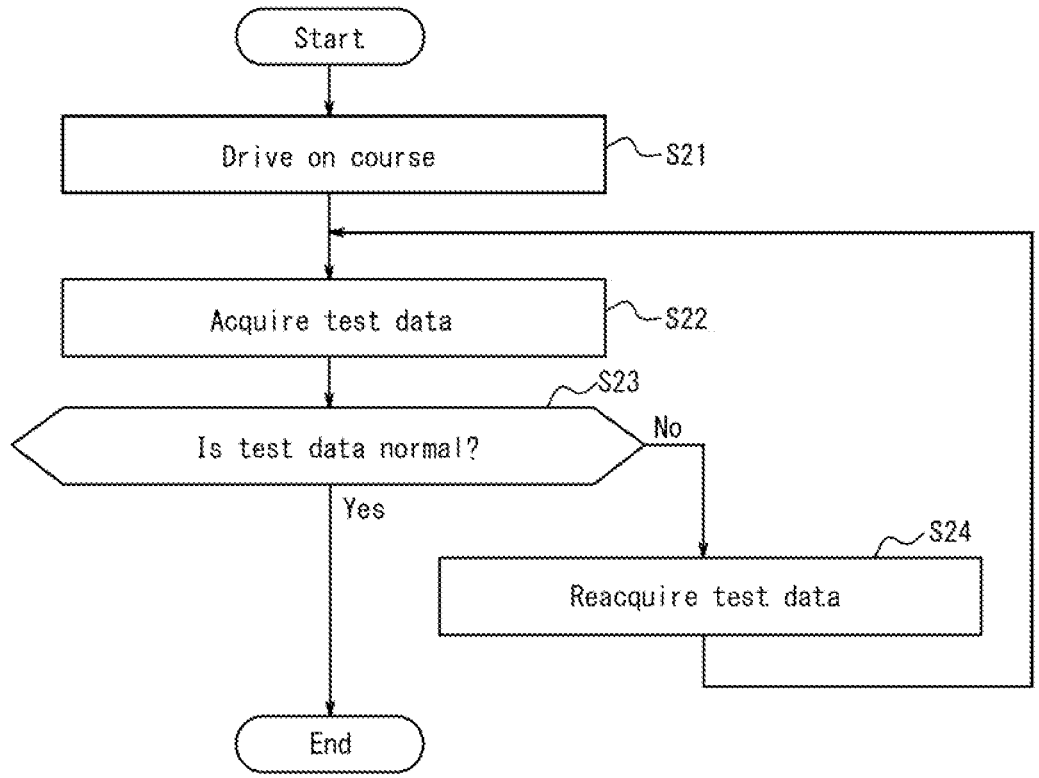

CONTROL METHOD, CONTROL DEVICE, CONTROL SYSTEM, AND TIRE TESTING METHOD

CROSS REFERENCE TO RELATED APPLICATIONS

This application is a National Stage of International Application No. PCT/JP2020/028335 filed Jul. 21, 2020, claiming priority based on Japanese Patent Application No. 2019-134885 filed Jul. 22, 2019.

TECHNICAL FIELD

The present disclosure relates to a control method, a control device, a control system, and a tire testing method.

BACKGROUND

A bench-top testing method and an actual vehicle testing method are known methods for testing tires. An example of the bench-top testing method is a method to bring a pseudo-surface of a drum into contact with a tire and detect the noise emitted by the tire while the drum is rotating (see Patent Literature 1). On the other hand, in an actual vehicle testing method, various tests are conducted while a vehicle is actually driven around a test course.

CITATION LIST

Patent Literature

PTL 1: JP 2013-134213 A

SUMMARY

Technical Problem

In recent years, in the above-described actual vehicle tests on tires, data has been acquired by mounting tires on a vehicle equipped with an autonomous driving function and driving the vehicle. In the vehicle equipped with an autonomous driving function, the vehicle position and obstacles around the vehicle are detected based on the detection results of sensors installed in the vehicle or on the course, and the driving of the vehicle is controlled based on these detection results.

Courses for tire testing often include banked sections having a curved shape and an inclined road surface that slopes upward from the inner periphery of the curve to the outer periphery so that the vehicle can change the driving direction without reducing the speed of the vehicle. The vehicle is required to maintain a relatively high speed in the banked section, even though the field of view is limited due to the shape of the banked section. The number of vehicles driving on the banked section is therefore usually limited to one. In view of these limitations, demand exists for technology that can improve the driving safety of vehicles in a banked section.

In light of the above problems, it is an aim of the present disclosure to provide a control method, a control device, a control system, and a tire testing method that can improve the driving safety of vehicles in a banked section.

Solution to Problem

A control method according to an embodiment of the present disclosure is a control method for controlling a vehicle that has tires mounted thereon and drives autonomously on a course, the course including a banked section, the control method including an acquisition step of acquiring a detection result of a sensor that detects information about the vehicle or the course, and a control step of stopping the vehicle so that the vehicle does not enter the banked section when it is determined that there is another vehicle in the banked section based on the detection result of the sensor.

A control device according to an embodiment of the present disclosure is a control device for controlling a vehicle that has tires mounted thereon and drives autonomously on a course, the course including a banked section, the control device including a controller configured to acquire a detection result of a sensor that detects information about the vehicle or the course and stop the vehicle so that the vehicle does not enter the banked section when determining that there is another vehicle in the banked section based on the acquired detection result of the sensor.

A control system according to an embodiment of the present disclosure includes a control device for controlling a vehicle that has tires mounted thereon and drives autonomously on a course and a sensor configured to detect information about the vehicle or the course. The course includes a banked section, and the control device includes a controller configured to acquire a detection result of the sensor and stop the vehicle so that the vehicle does not enter the banked section when determining that there is another vehicle in the banked section based on the acquired detection result of the sensor.

A tire testing method according to an embodiment includes a step of controlling, in accordance with the above-described control method, the vehicle to drive on the course, and a step of acquiring test data of tires mounted on the vehicle driving on the course. The course is a course for testing the tires.

Advantageous Effect

According to the present disclosure, a control method, a control device, a control system, and a tire testing method that can improve the driving safety of vehicles in a banked section can be provided.

BRIEF DESCRIPTION OF THE DRAWINGS

In the accompanying drawings:

FIG. 5 is a flowchart illustrating a tire testing method using the tire testing system illustrated in FIG. 4.

DETAILED DESCRIPTION

Embodiments of the present disclosure are described below through examples with reference to the drawings. In each drawing, the same reference sign indicates the same or equivalent components.

Figure 1:
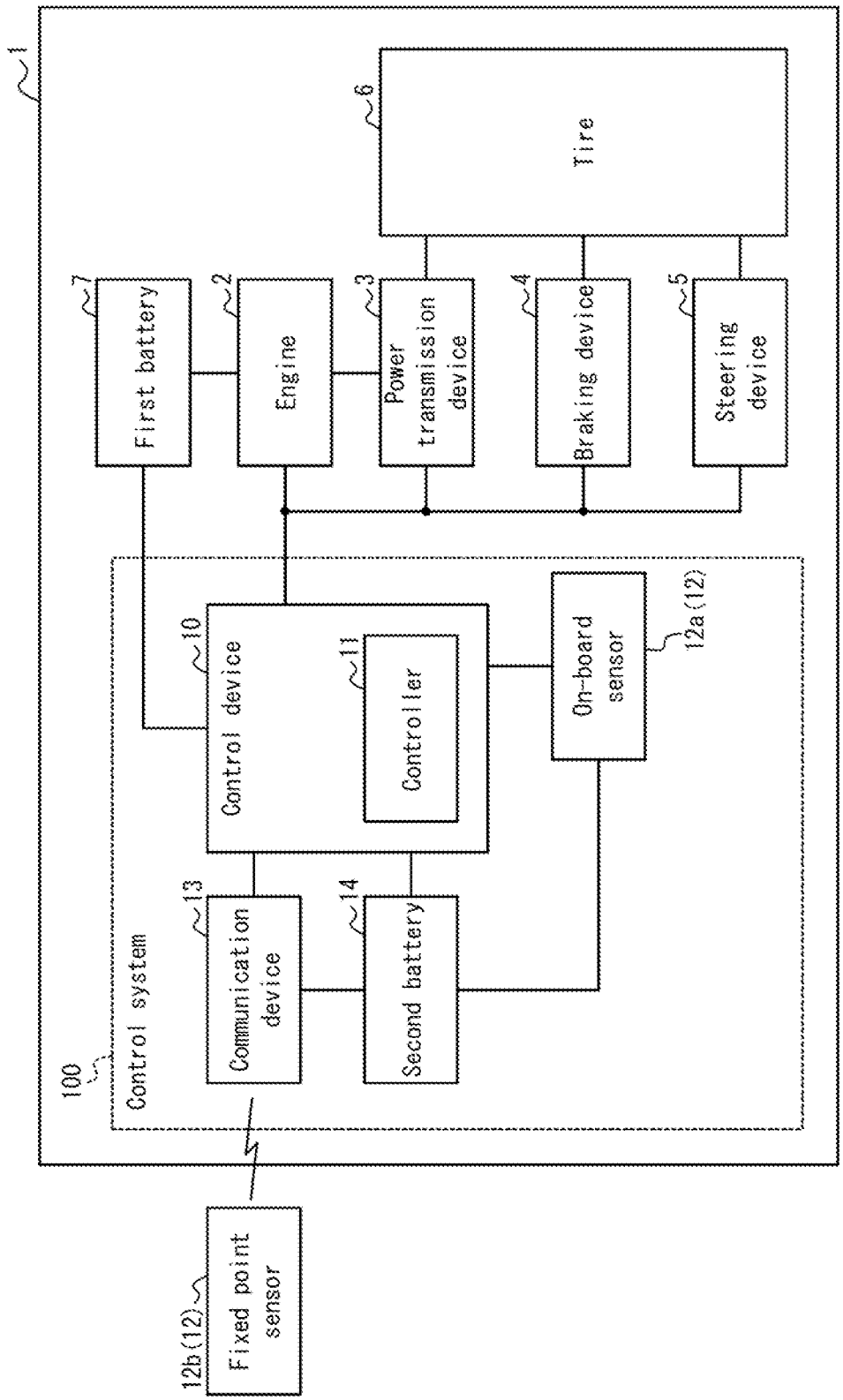
FIG. 1 is a block diagram illustrating an example configuration of a vehicle that includes a control device according to an embodiment of the present disclosure.

FIG. 1 is a block diagram illustrating an example configuration of a vehicle 1 that includes a control device 10 according to an embodiment of the present disclosure. The vehicle 1 includes tires 6 and drives on a course 200, illustrated in FIG. 2, for testing the tires 6. Details of the course 200 will be described later.

As illustrated in FIG. 1, the vehicle 1 includes an engine 2 as a power source, a power transmission device 3, a braking device 4, a steering device 5, tires 6, and a first battery 7. The power transmission device 3 includes a transmission or the like. The braking device 4 includes brakes or the like. The steering device 5 includes a steering wheel or the like. The vehicle 1 may include a motor instead of the engine 2 as a power source, or may include both the engine 2 and a motor.

The vehicle 1 is autonomously driven by the control system 100, described below. The autonomous driving level may, for example, be from level 3 to 5 as defined by the Society of Automotive Engineering (SAE).

The vehicle 1 starts the engine 2 using electric power from the first battery 7. The vehicle 1 may include a variety of electrical devices or electronic devices. The vehicle 1 may operate the electrical devices or electronic devices using electric power from the first battery 7 or the electric power of an alternator that generates electric power using power from the engine 2. The first battery 7 may be a secondary battery, such as a lead-acid battery or a lithium-ion battery.

The vehicle 1 further includes the control device 10 and an on-board sensor 12a.

The control device 10 controls autonomous driving of the vehicle 1 by controlling the engine 2, the power transmission device 3, the braking device 4, and the steering device 5. The control device 10 includes a controller 11. The controller 11 may include an arithmetic logic unit such as a central processing unit (CPU). The controller 11 may include a storage device such as a memory. The control device 10 may include a storage apart from the controller 11.

The controller 11 acquires detection results from all or a portion of a plurality of sensors 12 (the on-board sensor 12a and a fixed point sensor 12b, described below) and detects the position of the vehicle 1 and obstacles around the vehicle 1 based on the acquired detection results. The controller 11 controls the driving of the vehicle 1 based on the detection results of the position of the vehicle 1 and the obstacles around the vehicle 1.

The sensors 12 monitor the vehicle 1 or the course 200 and detect information about the vehicle 1 or the course 200. A plurality of sensors 12 is provided to detect various types of information about the vehicle 1 or the course 200. The sensors 12 may include the on-board sensor 12a mounted on the vehicle 1 and the fixed point sensor 12b installed along the course 200. The on-board sensor 12a mainly acquires information about the vehicle 1 on which the on-board sensor 12a is mounted. The information detected by the on-board sensor 12a may include information about the state of the vehicle 1, such as the position or the speed of the vehicle 1. The information detected by the on-board sensor 12a may include information about the conditions around the vehicle 1. The on-board sensor 12a may acquire information from various meters mounted on the vehicle 1, such as a speedometer, a tachometer, a fuel meter, or an odometer. The on-board sensor 12a may include a Global Positioning System (GPS) sensor that detects the position of the vehicle 1 using a positioning system such as GPS. The on-board sensor 12a may include a speed sensor that detects the speed of the vehicle 1 using GPS. The on-board sensor 12a may include a camera, such as a monochrome camera or a stereo camera, that captures images of the area around the vehicle 1. The on-board sensor 12a may include a Light Detection and Ranging (LiDAR) sensor that detects a surrounding object and the distance to the surrounding object by emitting electromagnetic waves, such as infrared waves or millimeter waves, and detecting reflected waves that occur when the electromagnetic waves are reflected by the surrounding object. The fixed point sensor 12b mainly acquires information about the course 200. The information about the course 200 may include information about conditions on the course 200 (for example, the presence or absence of an object such as a vehicle or obstacle). The fixed point sensor 12b may, for example, include a 3D-LiDAR sensor.

The vehicle 1 may further include a communication device 13. The communication device 13 may include a communication interface, such as a local area network (LAN). The communication device 13 may communicate with other devices, such as the fixed point sensor 12b, via the communication interface.

The vehicle 1 may further include a second battery 14. The second battery 14 may be a primary battery or a secondary battery. The second battery 14 may supply electric power to each component, such as the control device 10, the on-board sensor 12a, and the communication device 13.

The control device 10, the sensors 12 (on-board sensor 12a and fixed point sensor 12b), the communication device 13, and the second battery 14 form the control system 100 that controls autonomous driving of the vehicle 1. The control system 100 need not include the second battery 14. In this case, each part of the control system 100 (the control device 10, the on-board sensor 12a, and the communication device 13) may be supplied with electric power from the first battery 7.

Figure 2:
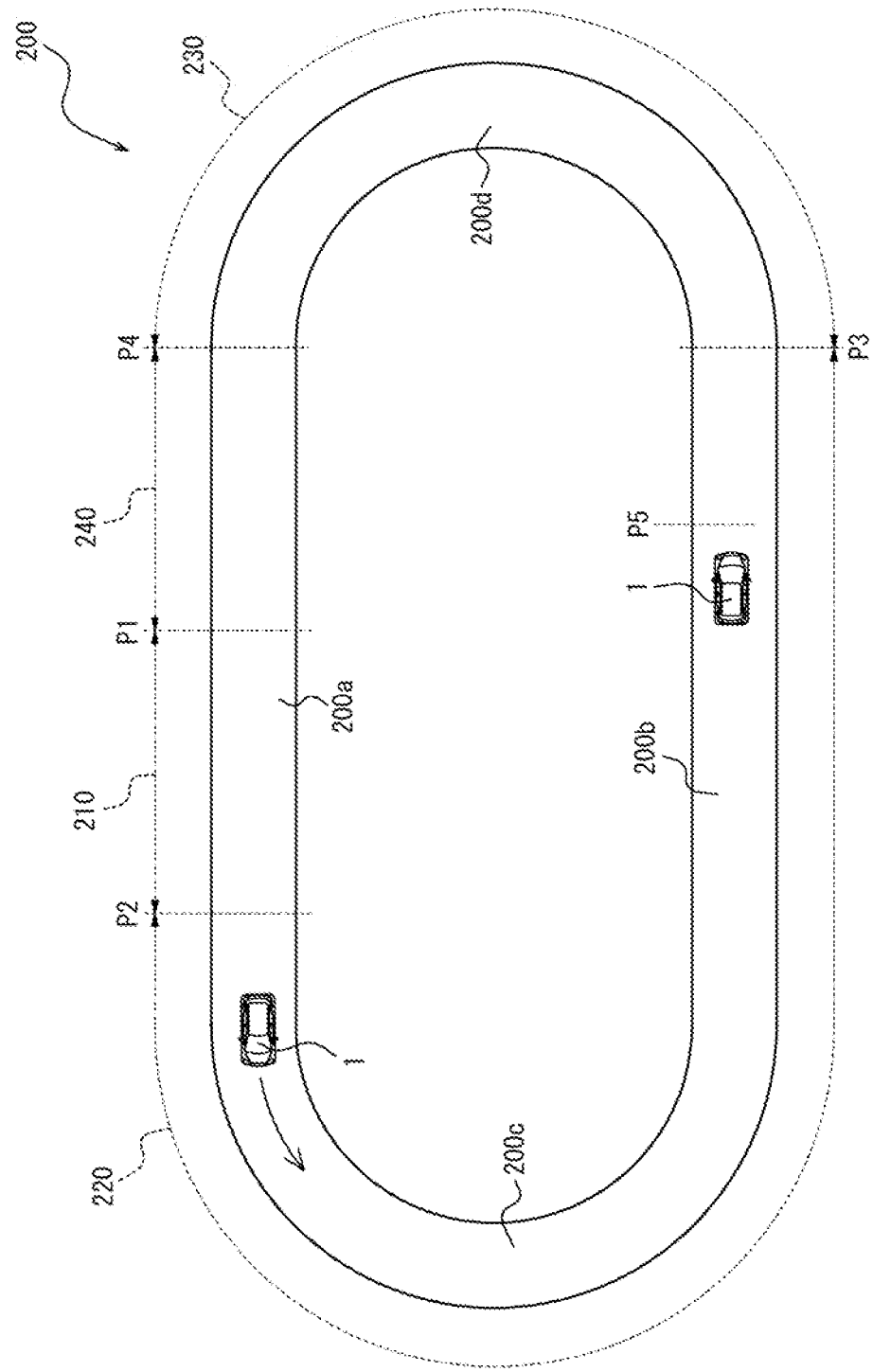
FIG. 2 is a plan view of an example course on which the vehicle illustrated in FIG. 1 drives.

As described above, the vehicle 1 is controlled by the control system 100 to drive autonomously on the course 200. The course 200 is, for example, a course on which the vehicle 1 drives to test the tires 6. FIG. 2 is a plan view of an example of the course 200 on which the vehicle 1 drives to test the tires 6.

As illustrated in FIG. 2, the course 200 is a closed circuit course comprising two straight tracks 200a, 200b extending parallel to each other, and semicircular curved tracks 200c, 200d disposed at the ends of the straight tracks 200a, 200b and connected so as to join the ends of both straight tracks 200a, 200b. The vehicle 1 drives around the course 200, which is a circuit, in a predetermined direction (counterclockwise in FIG. 2).

The course 200 is divided into a plurality of sections that are provided according to driving rules. For example, the course 200 includes a test section 210 that has a position P1 as a starting point and a position P2 as an ending point. The position P1 and the position P2 are included in the straight track 200a. Therefore, the test section 210 is a straight section. The test section 210 is a section for performing a test of the tires 6. The test of the tires 6 is, for example, a pass by noise (PBN) test. The pass-by noise test is conducted based on a predetermined standard for testing the tires 6. The predetermined standard may, for example, be ECE R117-02, which is an international standard relating to tire unit noise regulation. The road surface in the test section 210 may be a road surface based on the ISO 10844 standard. The test data in the pass-by noise test includes the noise level of driving noise generated by friction between the tires 6 and the road surface during driving of the vehicle 1 on which the tires 6 are mounted. In the pass-by noise test, the test data is acquired in such a way that the driving noise of the vehicle 1 does not include the driving noise of the engine 2 or the motor of the vehicle 1. To do so, the control device 10 stops the engine 2 or motor before the test section 210 (ignition off) and controls the driving of the vehicle 1 so that the vehicle 1 passes through the test section 210 in this state. The driving of the vehicle 1 with the engine 2 or the motor stopped is also referred to as coasting. The control device 10 drives the engine 2 or the motor (ignition on) after the vehicle 1 passes through the test section 210. Test data based on ECE R117-02 includes the noise level of driving noise acquired by driving the vehicle 1 at eight or more test speeds over approximately equal intervals in a range of ±10 km/h relative to a reference speed. After new tires 6 have been mounted on the vehicle 1 and before the test of the tires 6 is started, a break-in run is performed with the vehicle 1. During the break-in run, the vehicle 1 is driven for a predetermined distance. The distance driven during the break-in run is determined by a predetermined standard. The test of the tires 6 is not limited to a pass-by noise test and may be a different test.

In the case of a pass-by noise test, microphones are arranged on both sides, in the width direction, of the road surface of the test section 210, and the vehicle 1 travels along the center of the road surface of the test section 210 at a predetermined speed. Each of the microphones arranged on the sides of the road surface detects the noise level of the driving noise of the vehicle 1 while the vehicle 1 is driving on the test section 210, and acquires the noise level as test data of the tires 6.

During the pass-by noise test, it is required that no obstructing objects (including other vehicles) be present or enter within a predetermined distance (such as 50 m) while the vehicle 1 is driving through the test section 210 for acquisition of test data. That is, there is a driving rule stating that in the test section 210, the vehicle 1 travels a predetermined route at a predetermined speed for the test, and if another vehicle is traveling in the test section 210, the vehicle 1 should not be in the test section 210 or come within a predetermined distance from the test section 210.

The course 200 further includes an adjustment section 220, a banked section 230, and an acceleration section 240.

The adjustment section 220 has the position P2 as a starting point and a position P3 as an ending point. The position P3 is the position where the straight track 200b and the curved track 200d are connected. The adjustment section 220 includes a section of the straight track 200a after the test section 210, the curved track 220c, and the straight track 200b. That is, the adjustment section 220 is a section connected to the ending point of the test section 210 and the starting point of the banked section 230, described below. In the adjustment section 220, there is a driving rule stating that the vehicle 1 may drive at any speed along any route. In the adjustment section 220, the vehicle 1 can also overtake and be overtaken by other vehicles. In the adjustment section 220, the order of vehicles entering the test section 210 is adjusted, and other vehicles performing a test are avoided.

The banked section 230 has the position P3 as a starting point and a position P4 as an ending point. The position P4 is the position where the straight track 200a and the curved track 200d are connected. In the banked section 230, for example, an inclination such that the road surface slopes upward from the inner periphery of the curve to the outer periphery is provided. That is, the banked section 230 has, for example, a curved shape, and the road surface is inclined so as to slope upward from the inner periphery of the curve to the outer periphery. As a result of this inclination, the vehicle 1 drives on the outside of the semicircular corner in the banked section 230 and maintains a constant speed (such as 60 km/h) by using centrifugal force.

In the banked section 230, the vehicle is required to maintain a relatively high speed, even though the view from the vehicle is restricted due to the shape of the banked section 230. Therefore, for the sake of safety, only one vehicle at a time is allowed to drive on the banked section 230. A driving rule thus states that the vehicle travels on the banked section 230 while maintaining a constant speed on the outside of the road surface and does not enter the banked section 230 if another vehicle is traveling on the banked section 230. In accordance with this driving rule, the control device 10 causes the vehicle 1 to stop so as not to enter the banked section 230 if there is another vehicle or an obstacle in the banked section 230.

The acceleration section 240 has the position P4 as a starting point and the position P1 as an ending point. That is, the acceleration section 240 is a section connected to the starting point (position P1) of the test section 210. The distance of the acceleration section 240 is determined according to factors such as the speed required for testing the tires 6 in the test section 210, the type of the tires 6 mounted on the vehicle 1, the load of the vehicle 1, and the performance for acceleration of the vehicle 1. In the acceleration section 240, the control device 10 accelerates the vehicle 1 at a predetermined acceleration rate, for example, to the speed required upon entering the test section 210. Accordingly, there is a driving rule indicating to accelerate in the acceleration section 240 to the speed predetermined for the test.

In this way, the course 200 includes a plurality of sections established according to the driving rules.

Next, a control method for the vehicle 1 according to the present embodiment will be described.

Figure 3:
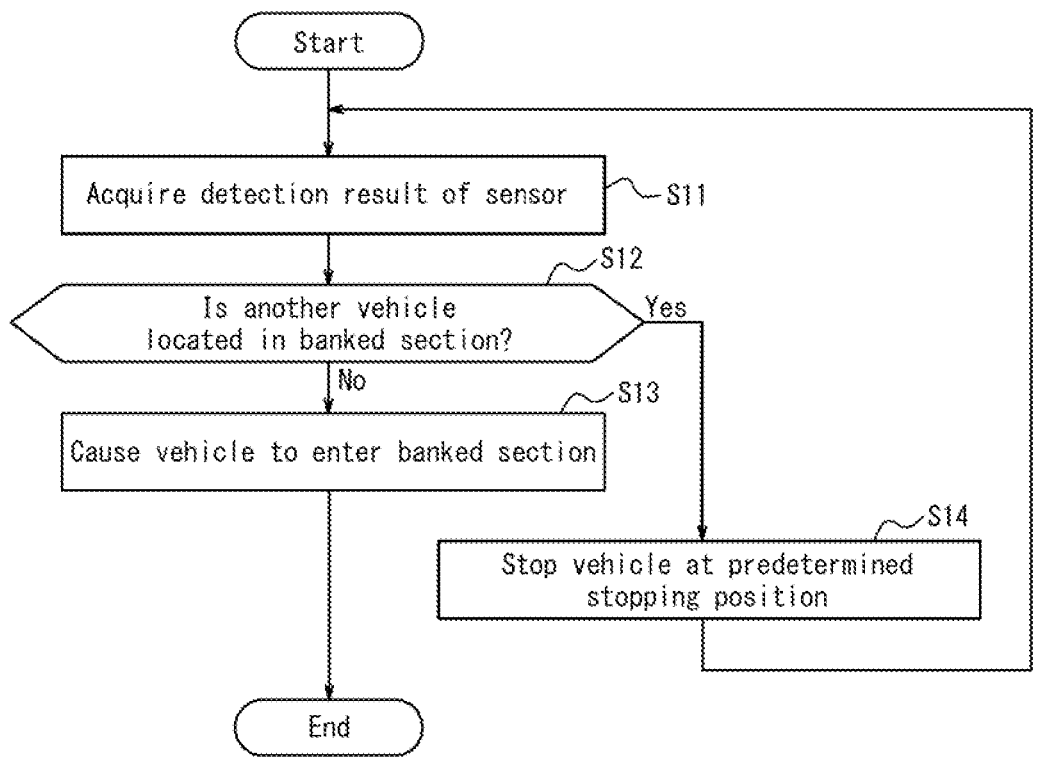
FIG. 3 is a flowchart illustrating an example of operations by the control device illustrated in FIG. 1 when a vehicle enters a banked section.

FIG. 3 is a flowchart illustrating an example of operations of the control device 10 and a control method of the vehicle 1 according to the present embodiment. In FIG. 3, a case in which the vehicle 1 enters the banked section 230 after driving through the adjustment section 220 is described as an example. That is, it is assumed that the control device 10 recognizes that the vehicle 1 is approaching the banked section 230. Whether the vehicle 1 is approaching the banked section 230 can be recognized by, for example, detecting the position of the vehicle 1 from the detection results of the sensors 12.

The controller 11 acquires the detection results of the sensors 12 (step S11). The control device 10 of the present embodiment acquires detection results from a plurality of sensors 12, including the on-board sensor 12a provided in the vehicle 1 and the fixed point sensor 12b provided on the course 200.

Next, the controller 11 determines whether there is another vehicle in the banked section 230 based on the detection results of the sensors 12 (step S12). Whether there is another vehicle in the banked section 230 can, for example, be determined based on the detection results of the 3D-LiDAR sensors installed around the banked section 230. Also, whether there is another vehicle in the banked section 230 can, for example, be determined from images captured by a stereo camera mounted on the vehicle 1.

The controller 11 may set a weighting (confidence level) for the plurality of sensors 12 and use the weighting and the detection results of the sensors 12 to detect the position of the vehicle 1 and/or obstacles around the vehicle 1. Accordingly, the controller 11 may, for example, detect the position of the vehicle 1 and/or obstacles around the vehicle 1 using only the detection result of a sensor 12 with a heavier weighting among the plurality of sensors 12.

When it is determined that no other vehicle is in the banked section 230 (step S12: No), the controller 11 causes the vehicle 1 to enter the banked section 230 (step S13). Specifically, the controller 11 causes the vehicle 1 to drive on the outside of the road surface of the banked section 230 while maintaining a constant speed (such as 60 km/h).

When it is determined that another vehicle is in the banked section 230 (step S12: Yes), the controller 11 stops the vehicle 1 at a stopping position P5, which is located ahead of the vehicle 1 in the travel direction at a predetermined distance from the starting point (position P3) of the banked section 230, as illustrated in FIG. 2 (step S14). The stopping position P5 may be an inner course on the road surface in the adjustment section 220 so that other vehicles can overtake the vehicle 1. The stopping position P5 is a position from which the vehicle 1 stopped at the stopping position P5 can accelerate to the predetermined speed (such as 60 km/h) required for driving in the banked section 230 before the vehicle 1 enters the banked section 230. After stopping the vehicle 1 at the stopping position P5, the controller 11 returns to the processing of step S11. Ahead of the vehicle 1 in the travel direction refers to the side closer from the viewpoint of the travel direction of the vehicle 1. Accordingly, the position P5 is closer than the position P3 from the viewpoint of the vehicle 1 driving on the course 200.

As described with reference to FIG. 3, a control method of the vehicle 1 according to the present embodiment includes an acquisition step of acquiring a detection result of the sensor 12 that detects information about the vehicle 1 or the course 200, and a control step of stopping the vehicle 1 so that the vehicle 1 does not enter the banked section 230 when it is determined that there is another vehicle in the banked section 230 based on the detection result of the sensor 12. In this way, the vehicle 1 does not enter the banked section 230 while there is another vehicle in the banked section 230, thereby improving the driving safety of the vehicle 1 in the banked section 230.

The control of the vehicle 1 by the control device 10 in the present embodiment is not limited to entry into the banked section 230, described above. The control device 10 may control the driving of the vehicle 1 according to the driving rules in each section included in the course 200. Other examples of the control of the vehicle 1 by the control device 10 are described below.

As described above, the controller 11 may use a weighting for the plurality of sensors 12 and the detection results of the sensors 12 to detect the position of the vehicle 1 and obstacles around the vehicle 1. In this case, the controller 11 may change the weighting for the plurality of sensors 12. Specifically, the controller 11 may change the weighting for the plurality of sensors 12 at the stopping position P5.

The banked section 230 has a shape in which the road surface is curved and inclined. Therefore, the detection accuracy may be affected in the banked section 230, depending on the type of the sensor 12, and a decrease in the detection accuracy or detection failure may occur. When such failure occurs, it becomes difficult to detect the position of the vehicle 1 and obstacles around the vehicle 1. Driving on the banked section 230 in such a state is not desirable in terms of safety. Therefore, by changing the weighting of the plurality of sensors 12 between the banked section 230 and sections other than the banked section 230, the position of the vehicle 1 and obstacles around the vehicle 1 can be detected using the detection results of sensors 12 whose detection accuracy tends not to be affected even in the banked section 230.

By aligning the stopping position P5 of the vehicle 1 with the position at which the weighting for the plurality of sensors 12 is changed, a control section based on the presence or absence of another vehicle in the banked section 230 overlaps with a control section that uses the weighting for the plurality of sensors 12. Therefore, the control section in which these controls are performed can be shortened, and a longer section can be used to adjust the driving speed, driving order, and the like of the vehicle. This enables tests to be performed efficiently.

As described above, the course 200 includes the test section 210 and the acceleration section 240 connected to the starting point (position P1) of the test section 210. There is a driving rule stating that in the test section 210, the vehicle 1 travels a predetermined route at a predetermined speed for the test, and if another vehicle is traveling in the test section 210, the vehicle 1 should not be in the test section 210 or come within a predetermined distance from the test section 210. There is also a driving rule indicating to accelerate in the acceleration section 240 to the speed predetermined for the test in the test section 210. The controller 11 may control the driving of the vehicle 1 based on these driving rules. For example, the controller 11 controls the driving of the vehicle 1 to satisfy the driving rules in the acceleration section 240 and the test section 210 by adjusting the timing for starting from the stopped state at the stopping position P5.

Specifically, the controller 11 may accelerate the vehicle 1 in the acceleration section 240 to the speed required for testing in the test section 210, and when there is another vehicle in the test section 210, the controller 11 may control the vehicle 1 so as not to come within a predetermined distance (such as 50 m) from the test section 210. In this way, when the vehicle 1 is to enter the test section 210, the vehicle 1 can be accelerated to the speed required for the test, and the vehicle 1 can be prevented from interfering with the test of another vehicle.

When another vehicle is conducting a pass-by noise test, the engine or motor of the other vehicle is stopped before the test section 210, and once the other vehicle has passed through the test section 210, the engine or motor of the other vehicle is driven. In this case, if the vehicle 1 passes through the test section 210 at high speed after the other vehicle passes through the test section 210 and before the speed of the other vehicle increases, the vehicle 1 may rear-end the other vehicle in the adjustment section 220 in the present embodiment.

To address this issue, when the vehicle 1 enters and passes through the test section 210 after another vehicle has passed through the test section 210, the controller 11 controls the vehicle to stay apart from the other vehicle by a distance for avoiding a collision with the other vehicle ahead. Accordingly, even when there is no other vehicle in the banked section 230 while the vehicle 1 is stopped at the stopping position P5, the controller 11 may be configured not to start the vehicle 1 until the distance from another vehicle ahead becomes the distance for avoiding a collision with the other vehicle. In this way, even during a test involving turning the ignition off and on, the vehicle 1 can be prevented from rear-ending another vehicle ahead.

The distance for avoiding a collision between the vehicle 1 and the other vehicle ahead can, for example, be calculated based on driving scenarios that specify the driving course, driving speed, and the like of the other vehicle ahead and the vehicle 1. The driving scenarios of the vehicle 1 and the other vehicle can, for example, be acquired from the server 30 described below.

As described above, the course 200 also includes the adjustment section 220 connected to the ending point (position P2) of the test section 210 and the starting point (position P3) of the banked section 230. In the adjustment section 220, there is a driving rule stating that the vehicle 1 may drive at any speed along any route. In the adjustment section 220, the controller 11 permits overtaking of other vehicles and overtaking by other vehicles.

In an actual vehicle test, a plurality of vehicles (including vehicles controlled by autonomous operation and vehicles operated by a driver) may simultaneously drive on the course 200, and various tests may be performed. By overtaking of other vehicles and overtaking by other vehicles being permitted in the adjustment section 220, the driving order and driving distance of the plurality of vehicles performing tests can be adjusted, and the tests can be performed efficiently.

Figure 4:
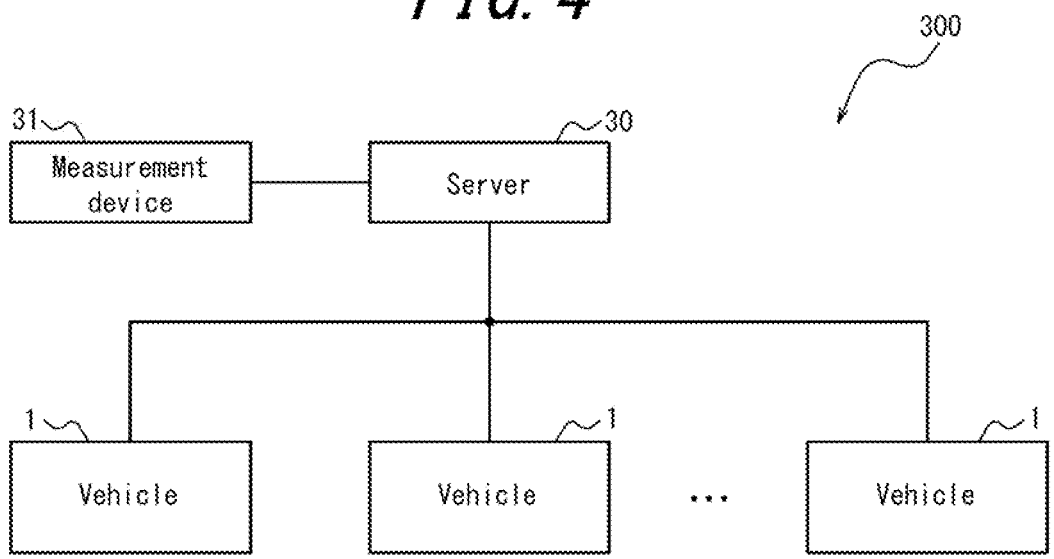
FIG. 4 is a block diagram illustrating an example configuration of a tire testing system for acquiring test data for tires mounted on the vehicle illustrated in FIG. 1.

FIG. 4 illustrates an example configuration of a tire testing system 300 for acquiring test data of the tires 6 mounted on the vehicle 1 driving on the course 200.

As illustrated in FIG. 4, the tire testing system 300 includes a server 30 and a measurement device 31.

The measurement device 31 acquires test data of tires 6 mounted on the vehicle 1 traveling on the course 200. In the case of a pass-by noise test, the measurement device 31 is a microphone provided at both ends in the width direction of the road surface of the test section 210. The measurement device 31 outputs the acquired test data to the server 30.

The server 30 acquires the test data acquired from the measurement device 31. The server 30 includes a communication interface for communicating with the communication device 13 mounted on the vehicle 1, and may communicate via the communication interface with the vehicle 1 (control system 100) that includes the communication device 13. The number of control systems 100 communicating with the server 30 may be one, or may be two or more.

The server 30 manages the test data of the tires 6. The server 30 transmits driving conditions (driving scenarios) of the vehicle 1 for testing the tires 6 to the vehicle 1 on which the tires 6 to be tested are mounted. The driving conditions of the vehicle 1 for testing the tires 6 are also referred to as test conditions. The test conditions may include driving rules for each section (test section 210, adjustment section 220, banked section 230, and acceleration section 240). The test conditions may include information regarding a predetermined standard. The test conditions may include a reference speed of the vehicle 1 at which the test data is to be acquired. The test conditions may include the number of pieces of test data to be acquired. The test conditions may include a reference for determining whether the acquired test data is normal. As the control device 10 drives the vehicle 1 based on the test conditions, the test data of the tires 6 mounted on the vehicle 1 is acquired by the measurement device 31.

The control device 10 may acquire the test data from the server 30 and determine whether the acquired test data is normal based on the test conditions. When the control device 10 determines that the test data is not normal, the control device 10 may cause the vehicle 1 to drive through the test section 210 to reacquire the test data. The control device 10 may cause the vehicle 1 to drive so as to reacquire only the test data determined not to be normal. The control device 10 may cause the vehicle 1 to drive so as to reacquire all the test data included in the test conditions. When determining that the acquired test data is normal, the control device 10 may terminate the control of the driving of the vehicle 1 based on the test conditions. By the control device 10 terminating the control of the driving of the vehicle 1 based on the determination result for the test data, the probability of redoing the test of the tires 6 is reduced. As a result, the efficiency of the test of the tires 6 is enhanced.

The server 30 may determine whether the acquired test data is normal. The control device 10 may acquire a determination result indicating whether the test data is normal from the server 30. When the control device 10 acquires a determination result indicating that the test data is not normal from the server 30, the control device 10 may cause the vehicle 1 to drive through the test section 210 to reacquire the test data. When the control device 10 acquires a determination result indicating that the test data is normal from the server 30, the control device 10 may terminate the control of the driving of the vehicle 1 based on the test conditions. When determining that the acquired test data is normal, the server 30 may transmit an instruction to the control device 10 to terminate the control of the driving of the vehicle 1 based on the test conditions. The control device 10 may terminate the control of the driving of the vehicle 1 based on the test conditions in response to the instruction from the server 30. With this configuration, the efficiency of the test of the tires 6 is enhanced.

FIG. 5 is a flowchart illustrating a tire testing method using the tire testing system 300 illustrated in FIG. 4. In FIG. 5, an example in which the controller 11 determines whether the test data is normal will be used.

According to the control method of the present embodiment, the controller 11 controls the vehicle 1 to drive on the course 200 (step S21).

The measurement device 31 acquires test data when the vehicle 1 drives through the test section 210 (step S22) and outputs the test data to the server 30. The server 30 acquires the test data of the tires 6 outputted from the measurement device 31 and transmits the acquired test data to the control device 10 installed in the vehicle 1 on which the tires 6 are mounted.

The controller 11 receives the test data transmitted from the server 30 and determines whether the test data is normal (step S23). The controller 11 may determine whether the test data is normal based on the test conditions.

When it is determined that the test data is normal (step S23: Yes), the controller 11 terminates the process after acquisition of all necessary test data.

When it is determined that the test data is not normal (step S23: No), the controller 11 causes the vehicle 1 to drive through the test section 210 so that the measurement device 31 can reacquire the test data (step S24).

In this way, a control method of the vehicle 1 according to the present embodiment includes an acquisition step of acquiring a detection result of the sensor 12 that detects information about the vehicle 1 or the course 200, and a control step of stopping the vehicle 1 so that the vehicle 1 does not enter the banked section 230 when it is determined that there is another vehicle in the banked section 230 based on the detection result of the sensor 12.

Furthermore, the control device 10 of the present embodiment includes the controller 11. The controller 11 acquires a detection result of the sensor 12 that detects information about the vehicle 1 or the course 200. The controller 11 stops the vehicle 1 so that the vehicle 1 does not enter the banked section 230 when determining that there is another vehicle in the banked section 230 based on the acquired detection result of the sensor 12.

The control system 100 according to the present embodiment includes the control device 10 for controlling the vehicle 1 that has the tires 6 mounted thereon and drives autonomously on the course 200, and a sensor 12 that detects information about the vehicle 1 or the course 200. The control device 10 includes the controller 11 that acquires the detection result of the sensor 12 and stops the vehicle 1 so that the vehicle 1 does not enter the banked section 230 when determining that there is another vehicle in the banked section 230 based on the acquired detection result of the sensor 12.

A tire testing method according to the present embodiment includes a step of controlling, in accordance with the above-described control method, the vehicle 1 to drive on the course 200, and a step of acquiring test data of the tires 6 mounted on the vehicle 1 driving on the course 200. The course 200 is a course for testing the tires 6.

Accordingly, the vehicle 1 does not enter the banked section 230 while there is another vehicle in the banked section 230, thereby improving the driving safety of the vehicle 1 in the banked section 230.

The control method, control device 10, control system 100, and tire testing method according to the present disclosure are not limited to the specific configurations described in the above embodiments. Various modifications and changes may be made without departing from the scope of the claims.

REFERENCE SIGNS LIST

1 Vehicle
2 Engine
3 Power transmission device
4 Braking device
5 Steering device
6 Tire
7 First battery
10 Control device
11 Controller
12 Sensor
12a On-board sensor
12b Fixed point sensor
13 Communication device
14 Second battery
100 Control system
200 Course
200a, 200b Straight track
200c, 200d Curved track
210 Test section
220 Adjustment section
230 Banked section
240 Acceleration section
300 Tire testing system
30 Server
31 Measurement device

The invention claimed is:

1. A control method for controlling a vehicle that has tires mounted thereon and drives autonomously on a course,
the course including a banked section,
the control method comprising:
an acquisition step of acquiring a detection result of a sensor that detects information about the vehicle or the course; and
a control step of stopping the vehicle so that the vehicle does not enter the banked section when it is determined that there is another vehicle in the banked section based on the detection result of the sensor, wherein
the course further includes a test section for testing the tires and an acceleration section connected to a starting point of the test section, and
the vehicle is controlled to accelerate in the acceleration section to a speed required for the testing in the test section, and when there is another vehicle in the test section, the vehicle is controlled so as not to come within a predetermined distance from the test section.

2. The control method of claim 1, wherein the vehicle is stopped at a stopping position, located ahead of the vehicle in a travel direction at a predetermined distance from a starting point of the banked section, when it is determined that there is another vehicle in the banked section.

3. The control method of claim 2, wherein the stopping position is a position from which the vehicle stopped at the stopping position can accelerate to a predetermined speed, required for driving in the banked section, before the vehicle enters the banked section.

4. The control method of claim 2, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and
in the detection step, the weighting for the plurality of sensors is changed at the stopping position.

5. The control method of claim 1, wherein when the vehicle enters and passes through the test section after another vehicle ahead has passed through the test section, the vehicle is controlled to stay apart from the another vehicle by a distance for avoiding a collision with the another vehicle.

6. The control method of claim 1, wherein
the course further includes an adjustment section connected to an ending point of the test section and a starting point of the banked section, and
in the adjustment section, overtaking of other vehicles and overtaking by other vehicles are permitted.

7. A control device for controlling a vehicle that has tires mounted thereon and drives autonomously on a course,
the course including a banked section,
the control device comprising a controller configured to acquire a detection result of a sensor that detects information about the vehicle or the course and stop the vehicle so that the vehicle does not enter the banked section when determining that there is another vehicle in the banked section based on the acquired detection result of the sensor, wherein
the course further includes a test section for testing the tires and an acceleration section connected to a starting point of the test section, and
the controller controls vehicle to accelerate in the acceleration section to a speed required for the testing in the test section, and when there is another vehicle in the test section, controls the vehicle so as not to come within a predetermined distance from the test section.

8. A control system comprising:
a control device for controlling a vehicle that has tires mounted thereon and drives autonomously on a course; and
a sensor configured to detect information about the vehicle or the course, wherein
the course includes a banked section, and
the control device includes a controller configured to acquire a detection result of the sensor and stop the vehicle so that the vehicle does not enter the banked section when determining that there is another vehicle in the banked section based on the acquired detection result of the sensor, wherein the course further includes a test section for testing the tires and an acceleration section connected to a starting point of the test section, and the controller controls vehicle to accelerate in the acceleration section to a speed required for the testing in the test section, and when there is another vehicle in the test section, controls the vehicle so as not to come within a predetermined distance from the test section.

9. A tire testing method comprising:
a step of controlling, in accordance with the control method of claim 1, the vehicle to drive on the course; and
a step of acquiring test data of tires mounted on the vehicle driving on the course, wherein
the course is a course for testing the tires.

10. The control method of claim 3, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and
in the detection step, the weighting for the plurality of sensors is changed at the stopping position.

11. The control method of claim 5, wherein
the course further includes an adjustment section connected to an ending point of the test section and a starting point of the banked section, and
in the adjustment section, overtaking of other vehicles and overtaking by other vehicles are permitted.

12. A tire testing method comprising:
a step of controlling, in accordance with the control method of claim 2, the vehicle to drive on the course; and
a step of acquiring test data of tires mounted on the vehicle driving on the course, wherein
the course is a course for testing the tires.

13. A tire testing method comprising:
a step of controlling, in accordance with the control method of claim 3, the vehicle to drive on the course; and
a step of acquiring test data of tires mounted on the vehicle driving on the course, wherein
the course is a course for testing the tires.

14. A tire testing method comprising:
a step of controlling, in accordance with the control method of claim 4, the vehicle to drive on the course; and
a step of acquiring test data of tires mounted on the vehicle driving on the course, wherein
the course is a course for testing the tires.

15. A tire testing method comprising:
a step of controlling, in accordance with the control method of claim 5, the vehicle to drive on the course; and
a step of acquiring test data of tires mounted on the vehicle driving on the course, wherein
the course is a course for testing the tires.

16. The control method of claim 5, wherein the vehicle is stopped at a stopping position, located ahead of the vehicle in a travel direction at a predetermined distance from a starting point of the banked section, when it is determined that there is another vehicle in the banked section.

17. The control method of claim 16, wherein the stopping position is a position from which the vehicle stopped at the stopping position can accelerate to a predetermined speed, required for driving in the banked section, before the vehicle enters the banked section.

18. The control method of claim 16, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and
in the detection step, the weighting for the plurality of sensors is changed at the stopping position.

19. The control method of claim 17, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and
in the detection step, the weighting for the plurality of sensors is changed at the stopping position.

20. The control method of claim 6, wherein the vehicle is stopped at a stopping position, located ahead of the vehicle in a travel direction at a predetermined distance from a starting point of the banked section, when it is determined that there is another vehicle in the banked section.

21. The control method of claim 20, wherein the stopping position is a position from which the vehicle stopped at the stopping position can accelerate to a predetermined speed, required for driving in the banked section, before the vehicle enters the banked section.

22. The control method of claim 20, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and
in the detection step, the weighting for the plurality of sensors is changed at the stopping position.

23. The control method of claim 21, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and
in the detection step, the weighting for the plurality of sensors is changed at the stopping position.

24. The control method of claim 11, wherein the vehicle is stopped at a stopping position, located ahead of the vehicle in a travel direction at a predetermined distance from a starting point of the banked section, when it is determined that there is another vehicle in the banked section.

25. The control method of claim 24, wherein the stopping position is a position from which the vehicle stopped at the stopping position can accelerate to a predetermined speed, required for driving in the banked section, before the vehicle enters the banked section.

26. The control method of claim 24, wherein
in the acquisition step, a detection result is acquired from a plurality of sensors,
the control method further comprises a detection step of detecting a position of the vehicle and/or an obstacle around the vehicle using a weighting for the plurality of sensors and the detection result of the sensors, and in the detection step, the weighting for the plurality of sensors is changed at the stopping position.

27. The control method of claim 25, wherein in the acquisition step, a detection result is acquired from a plurality of sensors, the control method further comprises a detection step of detecting a position of the vehicle and/or an obstacle around the vehicle using a weighting for the plurality of sensors and the detection result of the sensors, and in the detection step, the weighting for the plurality of sensors is changed at the stopping position.

28. A control method for controlling a vehicle that has tires mounted thereon and drives autonomously on a course, the course including a banked section, the control method comprising:

an acquisition step of acquiring a detection result of a sensor that detects information about the vehicle or the course; and a control step of stopping the vehicle so that the vehicle docs not enter the banked section when it is determined that there is another vehicle in the banked section based on the detection result of the sensor, wherein the course further includes a test section for testing the tires and an adjustment section connected to an ending point of the test section and a starting point of the banked section, and in the adjustment section, overtaking of other vehicles and overtaking by other vehicles are permitted.

29. The control method of claim 28, wherein the vehicle is stopped at a stopping position, located ahead of the vehicle in a travel direction at a predetermined distance from a starting point of the banked section, when it is determined that there is another vehicle in the banked section.

30. The control the method of claim 28, wherein the vehicle is stopping position is a position from which the vehicle stopped at the stopping position can accelerate to a predetermined speed, required for driving in the banked section, before the vehicle enters the banked section.

31. The control method of claim 29, wherein in the acquisition step, a detection result is acquired from a plurality of sensors, the control method further comprises a detection step of detecting a position of the vehicle and/or an obstacle around the vehicle using a weighting for the plurality of sensors and the detection result of the sensors, and in the detection step, the weighting for the plurality of sensors is changed at the stopping position.

32. The control method of claim 30, wherein in the acquisition step, a detection result is acquired from a plurality of sensors, the control method further comprises a detection step of detecting a position of the vehicle and/or an obstacle around the vehicle using a weighting for the plurality of sensors and the detection result of the sensors, and in the detection step, the weighting for the plurality of sensors is changed at the stopping position.

33. A control device for controlling vehicle that has tires mounted thereon and drives autonomously on a course, the course including a banked section, the control device comprising a controller configured to acquire a detection result of a sensor that detects information about the vehicle or the course and stop the vehicle so that the vehicle does not enter the banked section when determining that there is another vehicle in the banked section based on the acquired detection result of the sensor, wherein the course further includes a test section for testing the tires and an adjustment section connected to an ending point of the test section and a starting point of the banked section, and in the adjustment section, controller permits overtaking of other vehicles and overtaking by other vehicles.

34. A control system comprising:

a control device for controlling a vehicle that has tires mounted thereon and drives autonomously on a course; and a sensor configured to detect information about the vehicle or the course, wherein the course includes a banked section, and the control device includes a controller configured to acquire a detection result of the sensor and stop the vehicle so that the vehicle does not enter the banked section when determining that there is another vehicle in the banked section based on the acquired detection result of the sensor, wherein the course further includes a test section for testing the tires and an adjustment section connected to an ending point of the test section and a starting point of the banked section, and in the adjustment section, controller permits overtaking of other vehicles and overtaking by other vehicles.

35. A tire testing method for tires mounted on vehicle that drives autonomously on a course comprising:

a step of controlling the vehicle to drive on the course; and a step of acquiring test data of tires mounted on the vehicle driving on the course, wherein the course is a course for testing the tires, and the course including a banked section, the step of controlling comprising:

an acquisition step of acquiring a detection result of a sensor that detects information about the vehicle or the course; and a control step of stopping the vehicle so that the vehicle does not enter the banked section when it is determined that there is another vehicle in the banked section based on the detection result of the sensor.

36. A tire testing method comprising:

a step of controlling, in accordance with the control method of claim 6, the vehicle to drive on the course; and a step of acquiring test data of tires mounted on the vehicle driving on the course, wherein the course is a course for testing the tires.

37. A tire testing method comprising:

a step of controlling, in accordance with the control method of claim 11, the vehicle to drive on the course; and a step of acquiring test data of tires mounted on the vehicle driving on the course, wherein the course is a course for testing the tires.

38. A tire testing method comprising:

a step of controlling, in accordance with the control method of claim 11, the vehicle to drive on the course; and a step of acquiring test data of tires mounted on the vehicle driving on the course, wherein the course is a course for testing the tires.

39. A tire testing method comprising:

a step of controlling, in accordance with the control method of claim 16, the vehicle to drive on the course; and a step of acquiring test data of tires mounted on the vehicle driving on the course, wherein the course is a course for testing the tires.

40. A tire testing method comprising:

a step of controlling, in accordance with the control method of claim 17, the vehicle to drive on the course; and a step of acquiring test data of tires mounted on the vehicle driving on the course, wherein the course is a course for testing the tires.

41. A tire testing method comprising: a step of controlling, in accordance with the control method of claim 18, the vehicle to drive on the course; and a step of acquiring test data of tires mounted on the vehicle driving on the course, wherein the course is a course for testing the tires.

42. A tire testing method comprising:

a step of controlling, in accordance with the control method of claim 19, the vehicle to drive on the course; and a step of acquiring test data of tires mounted on the vehicle driving on the course, wherein the course is a course for testing the tires.

43. A tire testing method comprising:

a step of controlling, in accordance with the control method of claim 20, the vehicle to drive on the course; and a step of acquiring test data of tires mounted on the vehicle driving on the course, wherein the course is a course for testing the tires.

44. A tire testing method comprising:

a step of controlling, in accordance with the control method of claim 21, the vehicle to drive on the course; and a step of acquiring test data of tires mounted on the vehicle driving on the course, wherein the course is a course for testing the tires.

45. A tire testing method comprising:

a step of controlling, in accordance with the control method of claim 22, the vehicle to drive on the course; and a step of acquiring test data of tires mounted on the vehicle driving on the course, wherein the course is a course for testing the tires.

46. A tire testing method comprising:

a step of controlling, in accordance with the control method of claim 28, the vehicle to drive on the course; and a step of acquiring test data of tires mounted on the vehicle driving on the course, wherein the course is a course for testing the tires.

47. A tire testing method comprising: a step of controlling, in accordance with the control method of claim 24, the vehicle to drive on the course; and a step of acquiring test data of tires mounted on the vehicle driving on the course, wherein the course is a course for testing the tires.

48. A tire testing method comprising:

a step of controlling, in accordance with the control method of claim 30, the vehicle to drive on the course; and a step of acquiring test data of tires mounted on the vehicle driving on the course, wherein the course is a course for testing the tires.

49. A tire testing method comprising:

a step of controlling, in accordance with the control method of claim 26, the vehicle to drive on the course; and a step of acquiring test data of tires mounted on the vehicle driving on the course, wherein the course is a course for testing the tires.

50. A tire testing method comprising: a step of controlling, in accordance with the control method of claim 27, the vehicle to drive on the course; and a step of acquiring test data of tires mounted on the vehicle driving on the course, wherein the course is a course for testing the tires.

51. A tire testing method comprising: a step of controlling, in accordance with the control method of claim 28, the vehicle to drive on the course; and a step of acquiring test data of tires mounted on the vehicle driving on the course, wherein the course is a course for testing the tires.

52. A tire testing method comprising:

a step of controlling, in accordance with the control method of claim 29, the vehicle to drive on the course; and a step of acquiring test data of tires mounted on the vehicle driving on the course, wherein the course is a course for testing the tires.

53. A tire testing method comprising:

a step of controlling, in accordance with the control method of claim 30, the vehicle to drive on the course; and a step of acquiring test data of tires mounted on the vehicle driving on the course, wherein the course is a course for testing the tires.

54. A tire testing method comprising:

a step of controlling, in accordance with the control method of claim 31, the vehicle to drive on the course; and a step of acquiring test data of tires mounted on the vehicle driving on the course, wherein the course is a course for testing the tires.

55. A tire testing method comprising:

a step of controlling, in accordance with the control method of claim 32, the vehicle to drive on the course; and a step of acquiring test data of tires mounted on the vehicle driving on the course, wherein the course is a course for testing the tires.

56. A tire testing method comprising:

a step of controlling, in accordance with the control method of claim 33, the vehicle to drive on the course; and a step of acquiring test data of tires mounted on the vehicle driving on the course, wherein the course is a course for testing the tires.

57. A tire testing method comprising: a step of controlling, in accordance with the control method of claim 34, the vehicle to drive on the course; and a step of acquiring test data of tires mounted on the vehicle driving on the course, wherein the course is a course for testing the tires.

* * * * *